United States Patent [19]

Hogan

[11] 3,911,689
[45] Oct. 14, 1975

[54] PIPE LAYING VESSEL WITH STINGER AND METHOD
[75] Inventor: Michael G. Hogan, Tulsa, Okla.
[73] Assignee: Texaco Inc., New York, N.Y.
[22] Filed: Sept. 19, 1973
[21] Appl. No.: 398,618

[52] U.S. Cl. ................................................ 61/72.3
[51] Int. Cl.² ...................... F16L 1/00; B63B 35/04
[58] Field of Search ............ 61/72.3, 72.1; 114/.5 F

[56] References Cited
UNITED STATES PATENTS
3,583,169  6/1971  Morgan ............................... 61/72.3
3,756,034  9/1973  Lochridge et al. .................... 61/72.3

*Primary Examiner*—Jacob Shapiro
*Attorney, Agent, or Firm*—Whaley T. H.; C. G. Ries

[57]     ABSTRACT

Pipe supporting stinger and method for laying a submarine pipeline from a floating barge or vessel. The stinger includes at least one supplemental support member of uniform or non-uniform cross section, which functions as a rigidizing member disposed internally of, and in supporting engagement with the pipeline inner wall as the latter leaves the barge. The stinger internally supports that portion of the pipeline leaving the barge to achieve a desired pipe curvature between the water's surface and the ocean floor.

6 Claims, 8 Drawing Figures

PIPE LAYING VESSEL WITH STINGER AND METHOD

BACKGROUND OF THE INVENTION

In the normal laying of a submerged pipeline from a floating barge or vessel, the pipeline, depending on the depth of the water, must be at least partially supported as it leaves the barge. This support is necessary to avoid the possibility of the pipe or its coating becoming damaged or cracked due to overstraining of the pipe walls. This problem is particularly relevant since often the pipeline is weighted with a concrete outer layer or jacket as it is passed from the barge.

In the instance of deep water installation it has been found desirable to support the pipeline as it leaves the barge for at least a sufficient distance to permit the pipe to assume a desired downward curvature toward the ocean floor. Thus, with the aid of externally supporting stingers and similar support members, the pipe normally leaves the barge for a predetermined distance in a supported condition.

The supporting stinger can be fixedly positioned, or can be adjusted to assume a preferred curvature whereby the supported pipeline is guided. Thus, as a matter of practicality the pipeline will contact, and adapt the set curvature of the stinger for a predetermined distance from the barge. This distance is normally sufficient to permit the line to assume by virtue of its weight, a gradual downward orientation toward the ocean floor.

In the instance of external supporting stingers, the problem has arisen in disturbed or rough water wherein the lay barge or vessel is subject to rocking, pitching, rolling and the like. This action, when severe enough, tends to disorient the vessel and the stinger or worse it causes the pipeline to separate from the stinger. The resulting damage can be to either the pipeline itself or to the vessel. In either instance, such an action generally interrupts the laying operation until the pipe can be reoriented or repositioned onto the stinger supports.

Further in this type of open supporting stinger, wave motion acting against the pipeline itself, as well as the water current moving against it, could cause the pipeline to be displaced from its desired position. This, as above noted, could damage the pipe or the concrete jacket prior to the pipeline reaching its resting place at the ocean floor.

Toward overcoming the above noted operating problem peculiar to pipeline laying procedures and apparatus therefor, the present invention is provided. As hereinafter described the pipeline supporting stinger is operably connected to and depends from a floating lay barge or vessel to provide a degree of rigidity to the line being laid. The stinger comprises in essence an elongated, continuous central support member esuch as a length of pipe or tubing. The latter is characterized by a sufficient wall thickness to provide the necessary degree of rigidity to the pipeline. The inner rigidizing member can be further supplemented with tubular members telescopically positioned therein such that in effect the wall thickness, and consequently the rigidizing degree is adjustable.

To facilitate movement of the pipeline along the retained inner support member, the latter is provided with a plurality of longitudinally spaced support elements. Said elements are preferably provided with contact surfaces in the form of smooth sliding portions which engage the pipeline inner wall, or more preferably, with rollers which permit a rolling action between the inner guide element and the pipeline.

Figure 1:
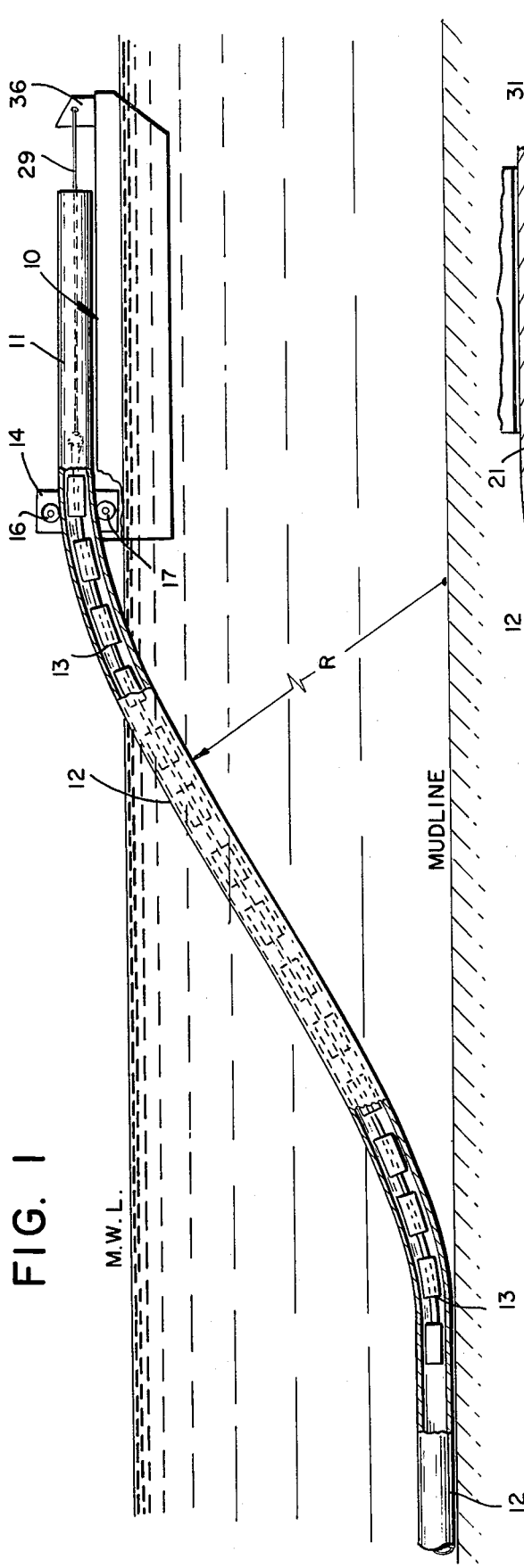
FIG. 1 represents an elevation view of a floatable lay barge including a pipe support stinger extending from the barge to the floor of a body of water.

Lay barge 10 is normally provided with a supply of discrete pipe or tubing segments 11, generally of uniform size. With respect to the actual laying operation the barge can be further provided with suitable means to apply an outer jacket to the pipe, and one or more welding stations for welding the discrete pipe sections end to end into a continuous pipeline 12.

As is usually found on lay barges of the type contemplated, the latter are provided with a tension and braking mechanism 14 to regulate and control passage of pipeline 12 from the barge. In the instant arrangement, the tension mechanism 14 comprises at least a pair of oppositely mounted, and peripherally grooved rollers 16 and 17. The latter are mutually adjustable and rotatably controlled. Thus, with pipeline 12 held between the respective rollers, the rate of passage from barge 10 is readily controllable. Further, said rollers function to clamp against the pipe outer surface to restrain it during a welding operation.

Subsequent to the pipe segments 11 being end welded into the contoured pipeline 12, the latter is passed over one end of barge 10, being internally supported by a stinger 13 which will be hereinafter more fully described.

Stinger 13 functions to regulate the radius R or the contour of pipeline 12 as it passes from the deck of barge 10 into the water and toward the ocean floor. Thus, line 12 will gradually adapt toward a vertical or a sloping disposition, and subsequently be deposited along the ocean floor. Stinger 13 can further support the pipeline as it reaches the sea floor thereby to minimize internal strain as the line straightens along said floor.

Normally, forward movement of lay barge 10 is regulated in accordance with the outfeed of pipeline 12. This will tend to regulate the disposition of the pipe between the ocean floor and at the water's surface. This forward movement of barge 10 is relatively important to avoid the imposition of undue strains on the descending pipe. This is true whether such strains be due to excessive tension, or to an undesirable curvature of the pipe as it engages its resting place at the ocean floor.

Figure 2:
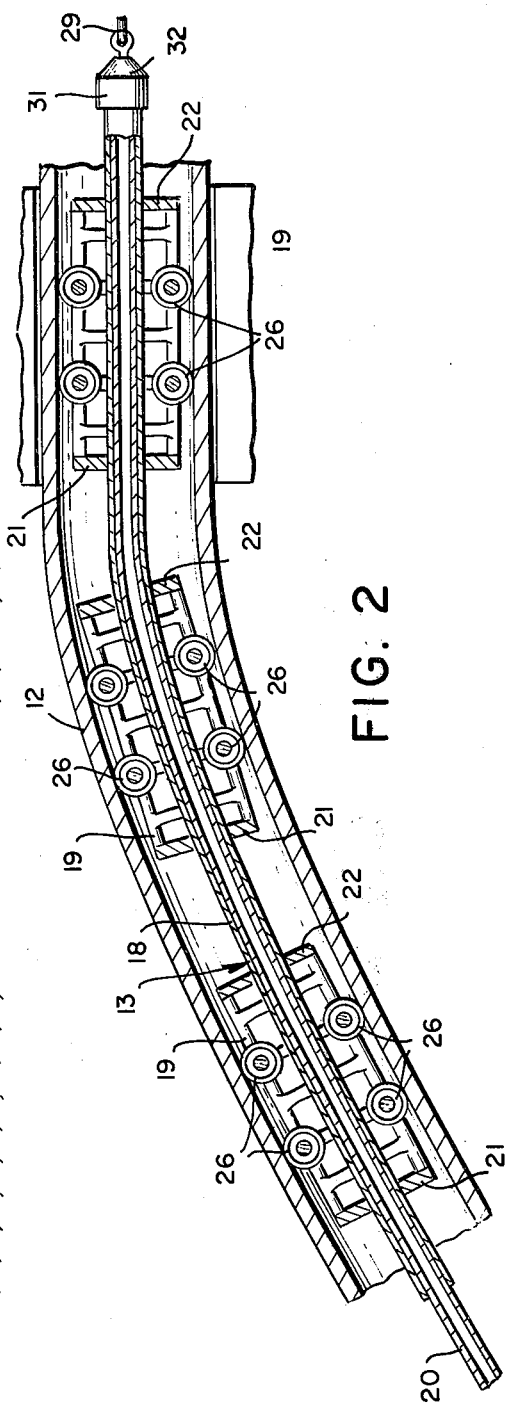
FIG. 2 is an enlarged sectional view of a segment of the stinger.

Referring to FIG. 2, stinger assembly 13 comprises an elongated relatively rigid walled central member 18 preferably of tubular cross section, such as heavy walled tubing or pipe. Said member is chosen of sufficient length and rigidity to provide the needed support to the descending pipeline 12 for the necessary distance.

The line's supported length can include the entire distance between barge 10 and the ocean floor as shown in FIG. 1. Normally however, it is of a sufficient length to provide only the upper end of the pipeline with a desired curvature before the line assumes a generally vertical disposition as in deep water operations.

To vary the rigidity of central member 18, the latter can be provided with additional smaller diameter ancillary or supplementary members which are insertable into the central member for the entire length thereof, or for a portion of said length. Such ancillary members are preferably slidably insertable into the central member, and are of a predetermined wall thickness and rigidity to afford the necessary pipe support and overall rigidity when combined with the wall thickness of the basic inner member 18.

Figure 3:
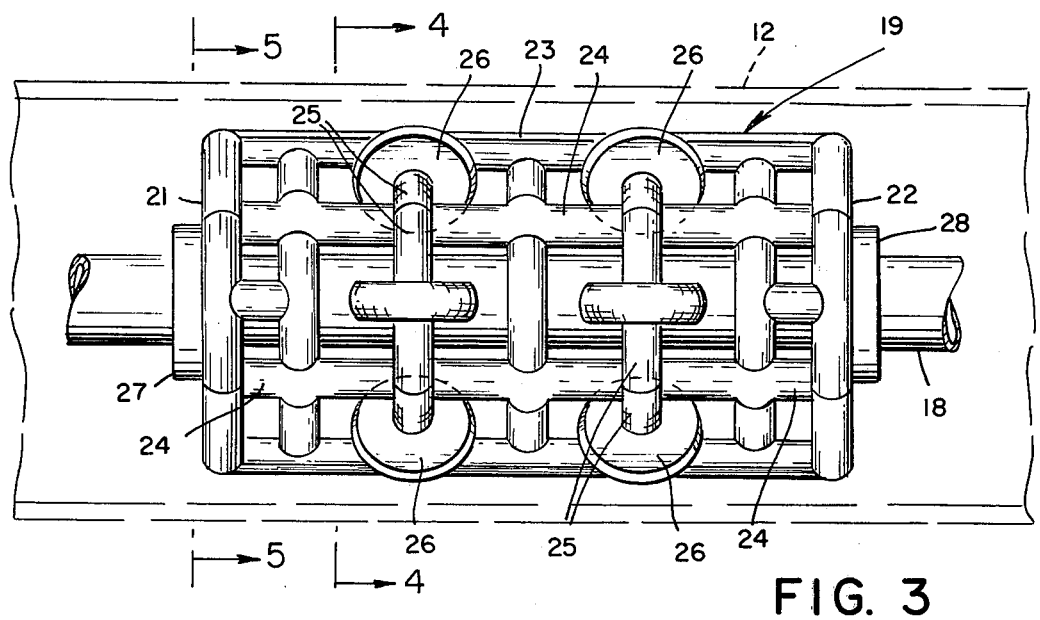
FIG. 3 is an enlarged segmentary view of the stinger showing an individual support unit.
Figure 4:
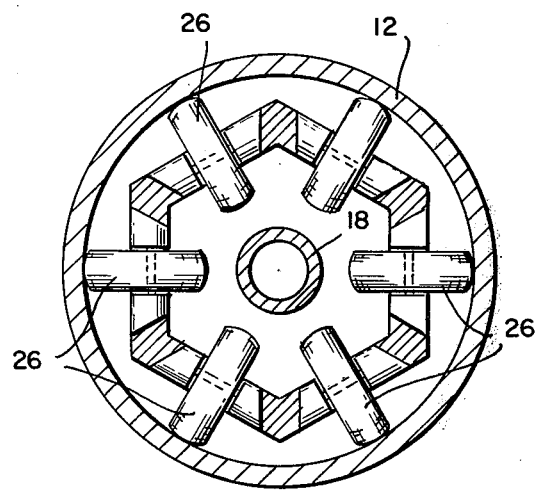
FIG. 4 is a cross sectional view taken along line 4—4 of FIG. 3.
Figure 5:
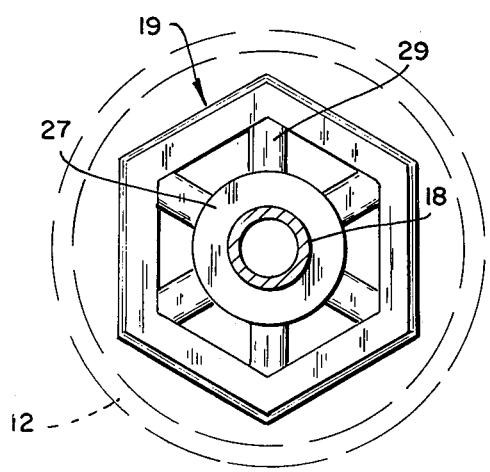
FIG. 5 is similar to FIG. 4.

Referring to FIGS. 3, 4 and 5, a plurality of carriages 19 are removably fastened to the outer wall of support member 18, being adapted to be slid therealong a desired distance, and thereafter fixed in place as stinger 13 is made up or assembled. Carriage 19 includes a cage-like arrangement comprising oppositely positioned end walls 21 and 22 which are mutually supported by a series of longitudinal braces 23 and 24.

Contact members 26 are operably positioned on the respective cages 19 by support braces 25 to bear against the inner wall of pipeline 12 as the latter passes from barge 10 into the water. Said contact members comprise low friction surfaces, or preferably are formed of a plurality of smooth rollers or wheels 26 journalled to the cage in a manner to permit free longitudinal movement between the inner cage 19 and pipeline 12.

Carriage 19 is further provided with a central clamping means including collars 27 and 28 positioned at opposed ends thereof, or with a continuous member extending centrally of the cage. Said end clamps are supported by a plurality of radial arms 29 fastened to fixedly position the respective collars relative to the cage outer edge.

As shown in FIG. 4, when properly inserted within pipeline 12, the respective smooth contact surfaces or wheels 26 are in rolling contact with the inner surface of the pipeline 12. Since the latter is often provided with an internal protective layer or coating, the wheels will not scar or damage the coating during downward passage of the pipeline along stinger 13.

While the present arrangement including radially mounted wheels 26 are found to satisfactorily support pipeline 12, similar low friction members such as pads and the like can be utilized as well so long as they are of such a nature to avoid damage to the pipeline inner coating.

Stinger 13 although relatively flexible, is retained on barge 10 by a suitable intermediate connector means such as a rigid element, but preferably by a cable or chain 30 connected to one end of the stinger and removably connected to the barge at 35. This latter connection will be a sufficient distance from the stinger end of the barge over which the pipeline 12 passes, to facilitate the prepositioning of further pipe lengths 11 for welding at the pipeline upper end.

Figure 6:
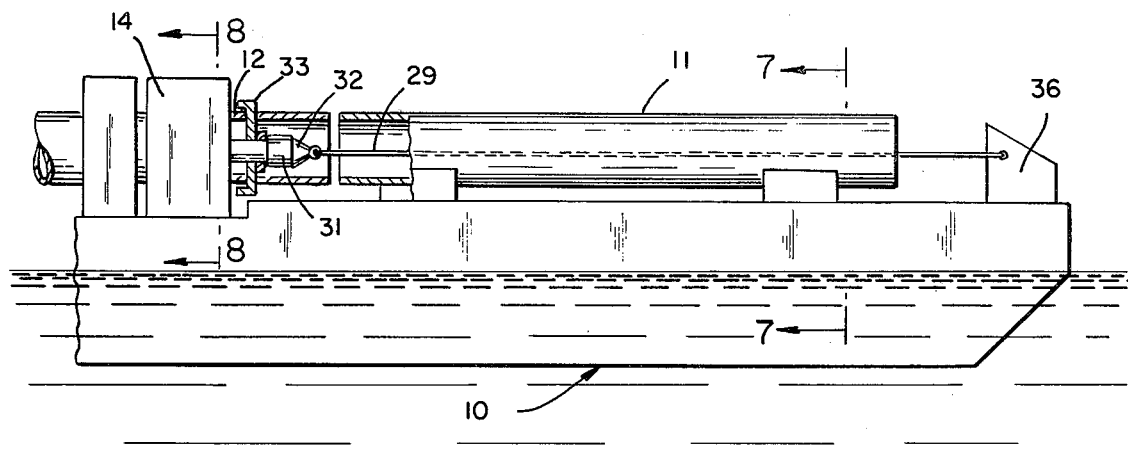
FIG. 6 is an elevation view in partial cross section showing a lay barge.
Figure 8:
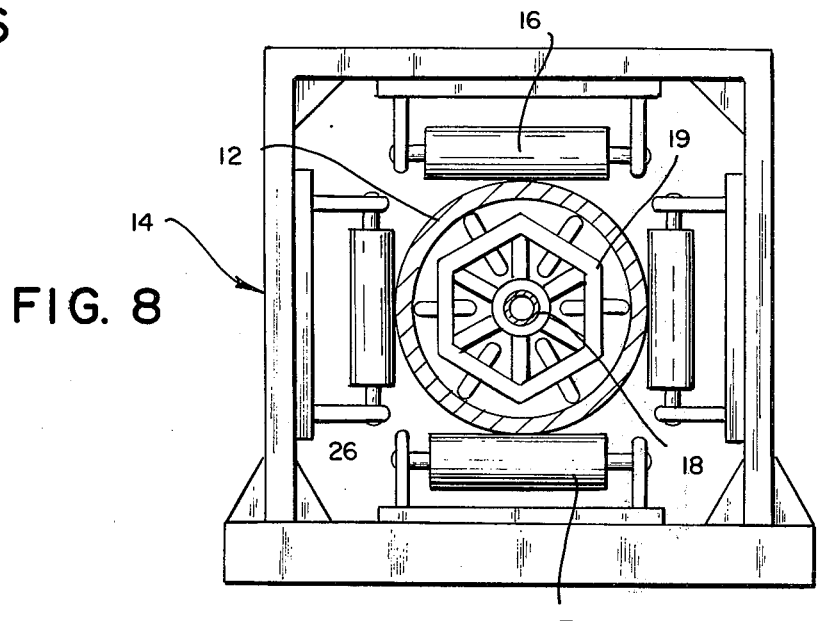
FIG. 8 is an enlarged cross sectional view taken along line 8—8 of FIG. 6.
Figure 7:
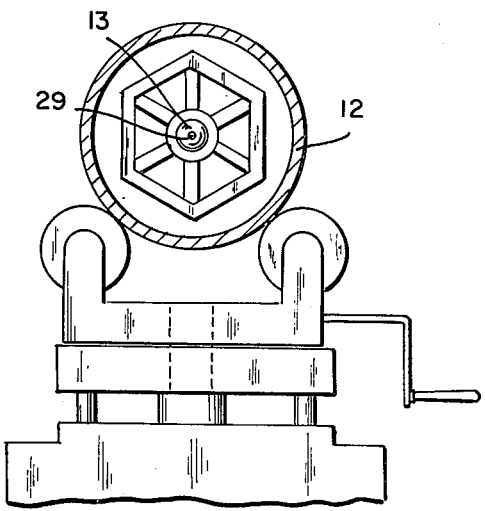
FIG. 7 is an enlarged cross sectional view taken along line 7—7 of FIG. 6.

Referring to FIGS. 2 and 6, barge 10 is, as previously mentioned, provided with a feed and braking mechanism 14 in the form of cooperatively spaced apart roller members 16 and 17. The latter are both controllably driven, and mutually adjustable to be tightly urged against the outer surface of pipeline 12 and thereby control the passage of pipeline 12 from the end of the barge into the water.

For engaging stinger 13 to the barge end, central support member 18 is provided with a cap 31 or similar connector which can be removably or fixedly welded to the closed end of the support member. Said cap 31 includes a head 32 adapted to fixedly receive flexible cable 29 which extends therefrom toward the mounting station 36 at the opposite end of barge 10.

Operationally, stinger 13 is prefabricated utilizing the necessary thickness and length of the center support member 18 in accordance with the weight and diameter of the pipeline 12, and the depth of water in which it is to be deposited. Further, the respective carriage members 19 are fixed to and spaced longitudinally along the support member 18 in accordance with the curvature to be imparted to the descending pipeline. Toward this purpose, center member 18 can be reinforced or supplemented with additional insertable members 20 disposed therein.

Initially a pipe length 11 is positioned about connecting cable 29. The latter is then fastened to mounting station 36 and pipe 11 is welded to the end of pipeline 12 which is held at the roller opening of tension mechanism 14. Rollers 17 and 18 are actuated to urge the pipe 12 guidably along the respective carriages 19, while the stinger is held in position and under tension, stinger 13 being retained by virtue of its end connection to station 36.

With the weight of pipeline 12 bearing against the stinger 13, the latter will assume the predetermined curvature to achieve the proper laying attitude as the pipe leaves the end of barge 10.

As the pipeline reaches mechanism 14 it is again fixedly positioned by adjusting the drive or tension rollers 16 and 17 to rigidly clamp pipe 12 therebetween. Normally the friction of stinger 13 within pipeline 12 will maintain the two in a relatively fixed relationship. However, to avoid the possibility of stinger 13 sliding downward through the retained pipeline 12 when the stinger is released from connecting element 30, an outstanding split collar 33 is removably applied to cap member 31. Collar 33 will thereafter bear against the exposed end surface of pipeline 12 thus maintaining stinger 13 in a fixed relationship to the pipeline.

When so positioned, the end of the retaining cable 29 is released from stantion 36. The next length of pipe 11 is positioned to be end welded to the pipeline end. Retainer cap 31 is again passed through the additional pipe length 11 and refastened in its anchored position to stantion 36. Collar 33 is now removed from cap 31, the new length of pipe advanced into abutting engagement with the pipeline 12 such that a peripheral weld can be applied.

With the added pipe length 11 fixedly positioned, the brake of tension mechanism 14 is again released to unclamp from between rollers 17 and 18. The latter are then actuated to further urge pipeline 12 over the barge edge. Simultaneously, barge 10 is progressed forward to as herein mentioned, coordinate the barge forward speed with the outward passage of pipeline 12 into the water.

As the pipeline is laid the function of stinger 13 is maintained so long as the water depth remains constant. For a change in the water depth the resiliency of stinger 13 can likewise be adjusted by the addition of an internal supplementary member 20 to the central support column 18 or by removal of said member. Toward adjusting the stinger curvature, the supplementary member 20 need not be of a constant wall thickness and/or constant rigidity. The rigidity thereof can be varied along the length of said member as in the instance where a lesser degree of rigidity is desired to afford a particular pipeline curvature.

Also, as the laying operation progresses, the length of stinger 13 can be adjusted. As shown in FIG. 1, should the water depth increase, stinger 13 will necessitate a greater length in order to reach to the ocean floor to assure a proper angle of contact between the pipeline and the floor.

Other modifications and variations of the invention as hereinbefore set forth may be made without departing from the spirit and scope thereof, and therefore, only such limitations should be imposed as are indicated in the appended claims.

I claim:

1. Method for laying a subterranean pipeline at the floor of a body of water from a floating vessel, which comprises the steps of;
   suspending a pipe support stinger from said vessel having one end thereof removably connected to the vessel and the other end directed toward the subsea floor,
   said stinger including an elongated support member having a plurality of guide elements spaced longitudinally thereof to engage the inner walls of a pipeline segment,
   adjusting the rigidity of said continuous support member to regulate the curvature thereof between the vessel and the subsea floor by removably engaging additional support elements therewith, and
   sequentially passing pipeline segments about said stinger whereby to regulate the pipe curvature during passage of the latter to the said floor.

2. In the method as defined in claim 1, wherein said support member comprises a continuous uniform wall tubing length, having additional tubing members inserted therein to alter the wall thickness and consequently the rigidity of said support member.

3. In a pipe guiding stinger for supporting a portion of a pipeline during the laying of said pipeline from a floating vessel onto the floor of a body of water, which includes;
   an elongated hollow member (12) having an uninterrupted passage extending longitudinally therethrough and having one end of said hollow member detachably connected to said floating vessel,
   a plurality of discrete guide elements (19) having attachment means thereon adapted to operably engage the outer surface of said elongated hollow member (12) whereby to be slidably adjustable on said hollow member for determining the spacing between adjacent of said guide elements, and
   roller means depending outwardly from said respective guide elements (19) and spaced therefrom a sufficient distance to engage and support the inner surface of a pipeline to support the latter and permit the downward passage thereof toward the ocean floor at a desired curvature, and
   supplemental support means positioned in said uninterrupted elongated passage.

4. In a pipe guiding stinger as defined in claim 3, including supplemental support means positioned within said uninterrupted passage and engaging the walls thereof to rigidize said elongated member and to modify the curvature of said stinger.

5. In a pipe guiding stinger as defined in claim 4, wherein said supplemental support means includes a pipe extending through said uninterrupted passage, and being of a substantially constant wall thickness whereby to provide a uniform degree of support to the elongated hollow member.

6. In a pipe guiding stinger as defined in claim 4, wherein said supplemental support means includes a pipe having a non-uniform wall thickness whereby to adjust the curvature of said elongated hollow member as desired.

* * * * *